US009961537B2

(12) United States Patent
Jang et al.

(10) Patent No.: US 9,961,537 B2
(45) Date of Patent: May 1, 2018

(54) WIRELESS COMMUNICATION DEVICE, INFORMATION PROCESSING METHOD AND RECORDING MEDIUM

(75) Inventors: Jun ho Jang, Seongnam-si (KR); Tae hyung Park, Seoul (KR)

(73) Assignee: INFOBANK CORP., Seongnam-si, Gyeonggi-Do (KR)

(*) Notice: Subject to any disclaimer, the term of this patent is extended or adjusted under 35 U.S.C. 154(b) by 805 days.

(21) Appl. No.: 14/235,429

(22) PCT Filed: Jul. 24, 2012

(86) PCT No.: PCT/KR2012/005893
§ 371 (c)(1),
(2), (4) Date: Jan. 27, 2014

(87) PCT Pub. No.: WO2013/019012
PCT Pub. Date: Feb. 7, 2013

(65) Prior Publication Data
US 2014/0164499 A1    Jun. 12, 2014

(30) Foreign Application Priority Data
Aug. 1, 2011    (KR) .................. 10-2011-0076713

(51) Int. Cl.
*G06F 15/16* (2006.01)
*H04W 8/24* (2009.01)
*H04W 4/02* (2018.01)

(52) U.S. Cl.
CPC ............. *H04W 8/24* (2013.01); *H04W 4/021* (2013.01)

(58) Field of Classification Search
USPC ............... 709/203, 223, 225, 227; 705/346; 715/234
See application file for complete search history.

(56) References Cited

U.S. PATENT DOCUMENTS 7,747,941 B2* 6/2010 Campbell ............. G06F 17/243
                                                                  715/234
8,150,844 B2* 4/2012 Redstone ............ G06F 17/3087
                                                                  455/456.1
(Continued)

FOREIGN PATENT DOCUMENTS

KR    10-2007-0055223 A    5/2007
KR       20080049424 A    6/2008
(Continued)

*Primary Examiner* — Tammy Nguyen
(74) *Attorney, Agent, or Firm* — Novick, Kim & Lee, PLLC; Sang Ho Lee

(57) ABSTRACT

The present invention relates to a wireless communication device, an information processing method, and a recording medium for the same. The wireless communication device according to the invention a checking section for checking ID information, set to a communication network by automatic setting or user's selection setting, of communication network IDs of one or more communication network devices accessible by the wireless communication device at current place, and checking a web address for a place corresponding to the checked network ID; and a processing section for changing a web address, for an output object, pre-set on a web browser program into the web address for the place corresponding to the checked network ID while interlocking with the web browser program equipped in the wireless communication device.

18 Claims, 4 Drawing Sheets

(56) References Cited

U.S. PATENT DOCUMENTS

| | | | | |
|---|---|---|---|---|
| 2005/0261929 | A1* | 11/2005 | Hansen | G06Q 10/101 |
| | | | | 705/346 |
| 2007/0005776 | A1* | 1/2007 | Hansen | G06Q 30/02 |
| | | | | 709/227 |
| 2007/0055223 | A1* | 3/2007 | Eckhouse | A61B 17/0057 |
| | | | | 606/28 |
| 2007/0198711 | A1* | 8/2007 | Maring | G06F 17/30905 |
| | | | | 709/225 |
| 2009/0030859 | A1* | 1/2009 | Buchs | G06F 17/30899 |
| | | | | 706/19 |
| 2011/0093327 | A1* | 4/2011 | Fordyce, III | G06Q 20/10 |
| | | | | 705/14.39 |
| 2012/0130849 | A1* | 5/2012 | Katz | G06Q 30/0631 |
| | | | | 705/26.7 |
| 2012/0191515 | A1* | 7/2012 | Katz | G06Q 30/0214 |
| | | | | 705/14.16 |
| 2014/0046772 | A1* | 2/2014 | Raman | G06Q 30/0255 |
| | | | | 705/14.66 |

FOREIGN PATENT DOCUMENTS

| | | |
|---|---|---|
| KR | 10-2009-0006993 A | 1/2009 |
| KR | 10-2010-0067419 A | 6/2010 |

\* cited by examiner

WIRELESS COMMUNICATION DEVICE, INFORMATION PROCESSING METHOD AND RECORDING MEDIUM

BACKGROUND OF THE INVENTION

1. Technical Field

The present invention relates to a wireless communication device for automatically changing a web address, for an output object, already set to web browser programs within a user's wireless communication device into the web address corresponding to a communication network ID set to the user's wireless communication device, an information processing method for the wireless communication device, and a recording medium for the same.

2. Description of the Related Art

With the prevalence of a smart phone to be supported with wireless Internet in recent years, users requests various place information for visiting places using a wireless terminal such as a user's smart phone to portal sites by keyword search on visiting the specific place and then outputs many place information to a screen by search results.

However, a using method of the search results through such a wireless Internet portal site has inconvenience that should input search keywords for visiting places after the user in full accesses the portal site and that again should search the search results, that the user wants, of many search results outputted through the portal site, or an operator of the corresponding place expects that the user searches the corresponding place information by the search results after registering place information that want to be provided to the user visiting the places into the portal site, but there are no means that may directly provide the place information, that the operator of the place wants, to the user' wireless terminal.

On the other hand, although a user directly knows addresses of web pages or web sites that provide the place information for the place, the user has inconvenience that should directly input the address of the web pages or the websites providing the place information for the place after driving web browsers.

SUMMARY OF THE INVENTION

An advantage of some aspects of the invention is that it provides a wireless communication device, an information processing method for the wireless communication device, and a recording medium for the same capable of receiving in real time the place information or web addresses for the place visited by the user without separable search or user's input and receiving the provided place information as information having high practicality, that the operator of the corresponding place want to provide, by automatically changing a web address, for an output object, already set to web browser programs within a user's wireless communication device into the web address corresponding to a communication network ID set to the user's wireless communication device.

A wireless communication device according to an embodiment of the invention includes a checking section for checking ID information, set to a communication network by automatic setting or user's selection setting, of communication network IDs of one or more communication network devices accessible by the wireless communication device at current place, and checking a web address for a place corresponding to the checked network ID; and a processing section for changing a web address, for an output object, pre-set on a web browser program into the web address for the place corresponding to the checked network ID while interlocking with the web browser program equipped in the wireless communication device A wireless communication device according to another embodiment of the invention includes a network setting program for outputting at least one accessible communication network ID the at current place on the screen and a web browser program for outputting a web corresponding to the web address, and further comprising: an automatic web address changing program for checking the ID information, set to the communication network by automatic setting or user's selection setting, of one or more communication network IDs outputted by the network setting program, checking the web address for the place corresponding to the checked ID information, and changing the web address, for an output object, pre-set on the web browser program into the checked web address while interlocking with the web browser program; and a controller for controlling the programs.

According to an aspect of the invention, the checking section may receive the web address for the place corresponding to the checked network ID from a place device connected to the network device through the network device and checks the received web address, or check the web address through a server on a communication network.

According to another aspect of the invention, the processing section may rechange the web address for the place corresponding to the network ID set on the web browser program into the previous web address when the changing of the network ID set to the wireless communication device is checked by the checking section.

According to another aspect of the invention, at least one of the checking section and the processing section may be a network setting program for outputting one or more communication network IDs accessible by the wireless communication device at current place on a screen, or may be included in functions of a web browser program equipped in the wireless communication device.

According to another aspect of the invention, an automatic web address changing program may be included in the network setting program or the web browser program.

An information processing method according to an embodiment of the invention comprises checking ID information, set to a communication network by automatic setting or user's selection setting, of one or more communication network IDs accessible by a wireless communication device at current place, and checking a web address for a place corresponding to the checked network ID; and changing the web address, for an output object, pre-set on the web browser program equipped in the wireless communication device into the checked web address.

According to an aspect of the invention, the information processing method further comprises rechanging the web address for the place corresponding to the network ID information set on the web browser program into the previous web address when the changing of the network ID set to the wireless communication device is checked.

According to the invention, the place includes at least one of marts, department stores, retail stores, schools, churches, cathedrals, temples, gymnasiums, theaters, playgrounds, public agencies, hospitals, funfairs, amusement parks, accommodations, car repair shops, museums and exhibition halls, and the wireless communication device has the web address providing information for the place.

BRIEF DESCRIPTION OF THE DRAWINGS

The following drawing drawings attached to the present specification illustrates an exemplary embodiment of the invention, and serves to further understand the technical idea of the invention along with a detailed description of the invention. Therefore, the invention is not limited to matters described in the drawings.

DESCRIPTION OF THE PREFERRED EMBODIMENTS

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Therefore, the detailed description of the present invention does not intend to limit the present invention to the disclosed embodiments. Further, it should be appreciated that the appended claims include even another embodiment. The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention. Therefore, the configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

Figure 1:
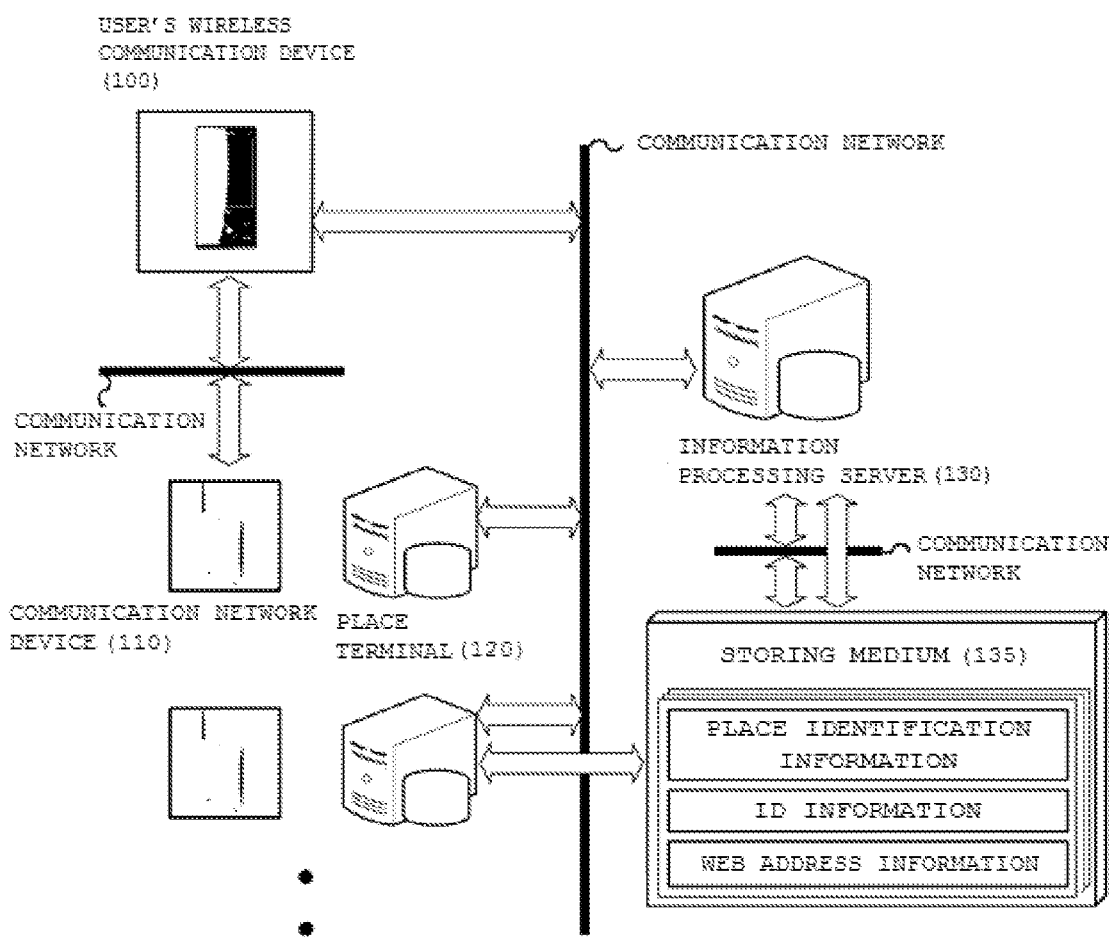
FIG. 1 shows configurations of the entire system according to an embodiment of the present invention.

FIG. 1 shows configurations of the entire system according to an embodiment of the present invention.

FIG. 1, in which a user's wireless communication device 100 is connected to a communication network device 110, a place device 120 and an information processing server 130 through the communication network, shows configurations for automatically changing a web address, for an output object, already set to web browser programs within the user's wireless communication device 100 into the web address corresponding to a communication network ID set to the user's wireless communication device 100.

Although not separately shown in the drawing, the connections among the information processing server 130, the storing medium 135, the user's wireless communication device 100 and the place device 120 may be variously configured by one skilled in the art.

The place device 120 of the present invention transmits web address information corresponding to network ID to the user's wireless communication device 100 connected to the communication network through the communication network device 110 according to an embodiment of the present invention.

The place terminal 120 in the present invention includes at least one of PC or POS connected to the communication network device 110 or a smart phone or tablet PC that belongs to the place operator.

The information processing server 130 in the present invention is connected to the user's wireless communication device 100 and the place device 120 through the communication network and therefore transmits the web address information corresponding to the network ID to the user's wireless communication device 100 through the communication network according to an embodiment of the present invention.

The place device 120 and information processing server 130 connects the web address information and the network ID and stores them into the storing medium 135 to transmit the web address information corresponding to the network ID to the user's wireless communication device 100.

The storing medium 135 interconnects at least one of the place identification information and the network ID information set to the communication network device 110 with the web address information and therefore stores them, and the storing medium 135 is directly connected to the place device 120 and the information processing server 130, or it is connected to them through the communication network.

In addition, the places of the present invention include at least one of marts, depart stores, retail stores, schools, churches, cathedrals, temples, gymnasiums, theaters, playgrounds, public agencies, hospitals, funfair fair, amusement parks, accommodations, car repair shops, museums and exhibition halls, and may include all places, disposed with the communication network device 110, except the places described above by one skilled in the art.

In addition, the place information in the present invention includes at least one of place abstract information, place guide map information, information page link information for the places, place information storage location information, various menu information provided from the places, various content information provided from the places, promotion information for the places, event information at the places, advertisement information to be outputted inside the place information or to upper or lower region outputted with the place information, and ticket or coupon information available at the places.

In addition, the network ID in the present invention includes communication network IP information or IP address, or may be IP information or IP address itself, includes identification information for the place device connected to the communication network device 110 or may be the identification information itself, and may include password information in case of requesting password input on accessing the user's wireless communication device 100.

The communication network in the present invention means a local area network such as Wi-Fi communication network, and one skilled in the art may change the range of the communication network from local area to long area or may extend the range of the communication network into mobile networks.

The communication network device 110 in the present invention performs the role of an access point connecting the user's wireless communication device 100 and the communication network, and provides ID of the communication network device 120 to the user's wireless communication device 100.

Figure 2:
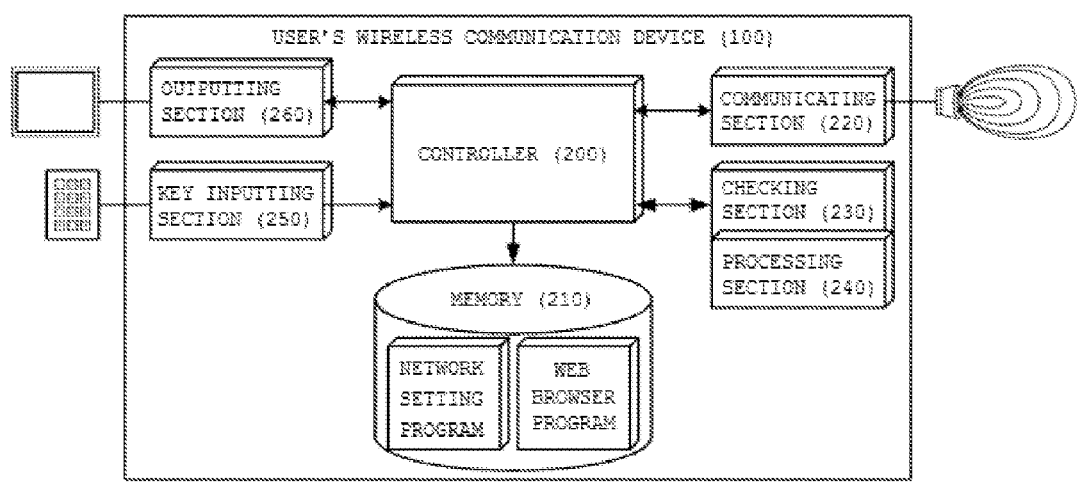
FIG. 2 shows sub-configurations of a user's wireless communication device according to an embodiment of the present invention.

FIG. 2 shows sub-configurations of the user's wireless communication device 100 according to an embodiment of the present invention.

Important configurations of the wireless communication device 100 in the present invention includes a memory 210 for storing network setting programs and web browser programs, a communicating section 220, a checking section 230, a processing section 240, an outputting section 260 outputting all kinds of data or information on a screen, a key inputting section 250, and a controller 200 for controlling each configuration and program, and each configuration may be added or excluded according to kinds or characteristics of the wireless communication device 100.

Referring to FIG. 2, the memory 210 stores the network setting programs providing network setting function and the web browser programs providing web surfing function in the wireless communication device 100, checks the ID information, set to the communication network by automatic setting and a user's selection setting, of at least one communication network ID outputted through the network setting programs from case to case although not shown in the drawing, checks the web address for the place corresponding to the checked network ID, and further stores automatic web address changing programs for changing the web address, for an output object, already set to the web browser programs into the web address for the place corresponding to the checked network ID information while interlocking with the web browser programs.

The memory 210, which is a collective name of memory elements for storing a predetermined program routine (or code) and/or program data (for example, information and/or data inputted and outputted when operations by the program routine (or code) is performed) for controlling whole operations of the wireless communication device 100, includes ROM (Read Only memory) corresponding to read only memory, readable/writable Flash Memory (FM), and EEPROM (Electrically Erasable and Programmable Read Only Memory), etc.

The communicating section 220 in the embodiment of the present invention connects the communication network between the user's wireless communication device 100 and the communication network device 110, disposed in the place visited by a user, through the network setting programs.

The communication network in the present invention means a local area network such as Wi-Fi communication network, and one skilled in the art may change the range of the communication network from local area to long area or may extend the range of the communication network into mobile networks.

The checking section 230 in an embodiment of the present invention checks the communication network ID information set to the wireless communication device 100 at current places through the communicating section 220.

In an embodiment of the present invention, the checking section 230 checks the network ID information set through the network setting programs while interlocking with the network setting programs equipped in the wireless communication device 100, and checks the communication network ID information set to the wireless communication device 100 at current place.

Further, the checking section 230 checks web address information for the place corresponding to the checked network ID. In this case, the checking section 230 directly receives and checks the web address information from the place device 120 connected to the network device 110 through the network device 110 or transmits the network ID to the information processing server 130 through the communication network, and receives and checks the web address information corresponding to the network ID from the information processing server 130.

In addition, when the web address information corresponding to the network ID is already stored into the memory 210 within the wireless communication device 100, the checking section 230 may check the web address information corresponding to the network ID through the memory 210.

Further, the information checking section 230 may further check location information of the wireless communication device 100 using GPS (Global Positioning System) information or communication network base station information, local network or repeater information, etc. and schemes for checking location information in the wireless communication device 100 may be achieved in various schemes according to the development of relevant technologies.

Since technologies for checking the location information for the wireless communication device 100 are well-known technologies, the detailed description for it is omitted.

The processing section 240 in an embodiment of the present invention changes the web address, for the output object, already set to the web browser programs into the web address for the place corresponding to the checked network ID information while interlocking with the web browser programs equipped in the wireless communication device 100.

The processing section 240 may rechange the web address for place corresponding to the network ID information set to the web browser programs into the previous web address when the changing of the network ID set to the wireless communication device 100 is checked by the checking section 230.

That is, on driving the web browser programs equipped in the wireless communication device 100, the user drives on to previous web browser programs, checks the web address information that had been used, and accesses the previous used web address, the processing section 240 does not allow the user to access the previous used web address and allow the user to access the web address for the place corresponding to the network ID information on driving web browser programs by the user by changing the web address information that had been used on driving web browser programs proximately into the web address for the place corresponding to the checked network ID information by the user.

In addition, when the checking section 230 checks the changing of the network ID set to the wireless communication device 100, the processing section 240 may rechange a part changed into the web address for the place corresponding to the network ID information into the previous used web address on driving web browser programs by the user through the web browser programs.

For example, the user accesses NAVER website using a safari web browser equipped in an eye phone at a place A and plays web surfing, and then ends the safari web browser. Then, after the user moves into place B, that is, a theater B, he sets the network ID through the communication network device 110 disposed in the theater B.

In prior art, when the user drives the safari web browser at the place B, the user accesses NAVER website that had been ended at the place A.

However, according to the present invention, when the web address information for a webpage or website for the theater B corresponding to the network ID is checked by the checking section 230, the user already set to the safari web browser changes the web address for NAVER website that had been ended at the place A into web address information for the theater B by the processing section 240. Therefore, when the user drives the safari web browser in a state setting a network to the network ID corresponding to the place B, the user does not access NAVER website that had been ended at the place A and accesses the webpage or website for the theater B.

Then, when the user deviates the place B and therefore the network ID is changed by the communication network device 110 disposed in the theater B, the processing section 240 rechanges the web address information for the theater B that had been set to the safari web browser into the web address for NAVER website that had been ended at the place A by the previous user.

According to the present invention, at least one of the checking section 230 and the processing section 240 is included in a function of the network setting programs for outputting at least one communication network ID connected with the wireless communication device 100 at current place on the screen, or may be included in the function of the web browser programs equipped in the wireless communication device 100, checks the ID information, set to the communication network by the automatic setting or the user's selection setting, of at least one communication network ID outputted by the network setting programs, checks the web address for the place corresponding to the checked network ID, interlocks with the web browser programs, and changes the web address, for an output object, already set to the web browser programs into the web address for the place corresponding to the checked network ID information by separable automatic web address changing programs.

Hereinafter, a process for automatically changing the web address, for an output object, already set to web browser programs within the user's wireless communication device 100 into the web address corresponding to the communication network ID set to the user's wireless communication device 100 will be described in more detail.

Figure 3:
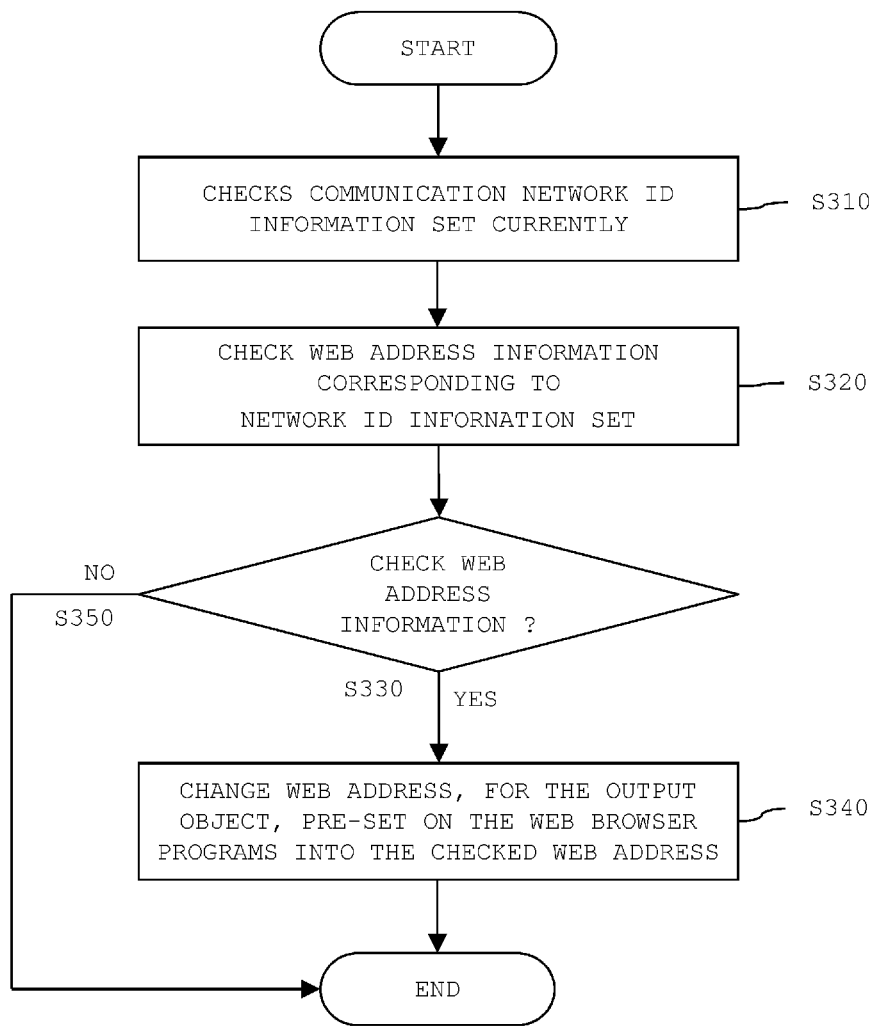
FIG. 3 shows a process for changing a web address, for an output object, already set to web browser programs within a user's wireless communication device into the web address corresponding to a network ID set to a communication network according to an embodiment of the present invention.

FIG. 3 shows a process for changing a web address, for an output object, already set to web browser programs within a user's wireless communication device 100 into the web address corresponding to a network ID set to a communication network according to an embodiment of the present invention.

Firstly, when the communication network is set between the communicating section 220 of the user's wireless communication device 100 and the communication network device 110, the checking section 230 equipped in the user's wireless communication device 100 checks the communication network ID information set to the wireless communication device 100 at current place while interlocking with the network setting programs (S310).

The checking section 230 directly receives the web address information from the place device 120 connected to the network device 110 through the network device 110, checks the web address information corresponding to the network ID, or transmits the network ID to the information processing server 130 through the communication network, receives the web address information corresponding to the network ID from the information processing server 130 and therefore checks the web address information corresponding to the network ID, or checks the web address information corresponding to the network ID through the memory 210 when the web address information corresponding to the network ID is already stored into the memory 210 within the wireless communication device 100 (S320).

When the checking section 230 checks the web address information corresponding to the network ID (S330), the processing section 240 automatically changing the web address, for the output object, already set to the web browser programs within a user's wireless communication device into the web address for the place corresponding to the checked network ID information (S340).

When the checking section 230 does not check the web address information corresponding to the network ID, the processing section 240 ends a web address information changing process (S350).

Figure 4:
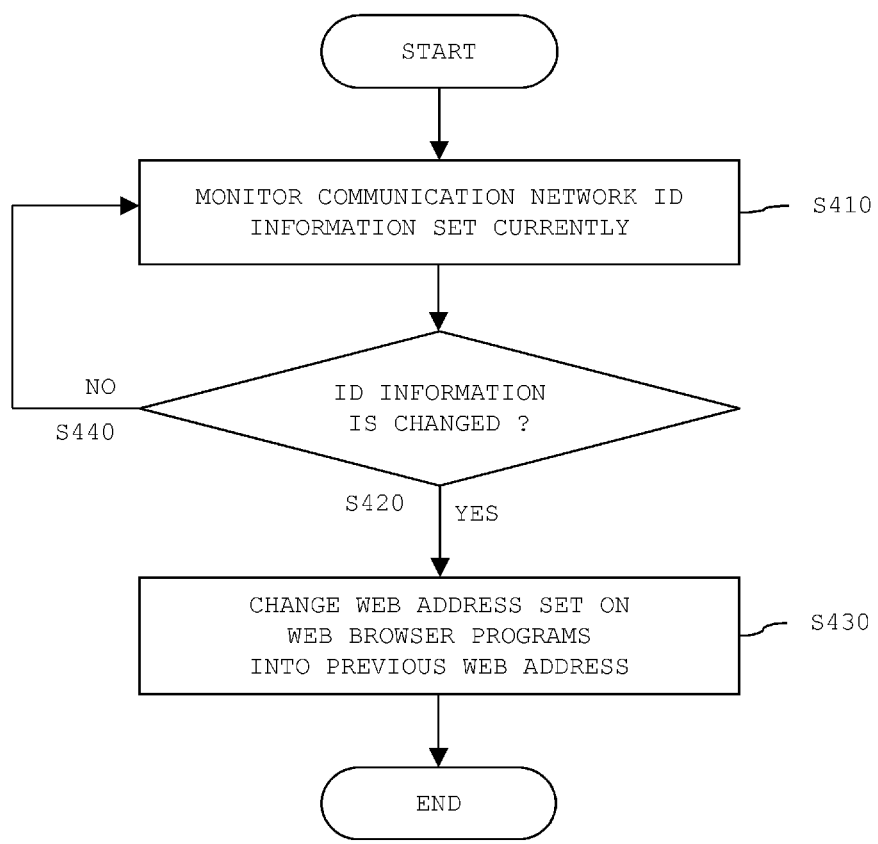
FIG. 4 shows a process for rechanging the web address for a place corresponding to the network ID within the user's wireless communication device into the previous web address according to an embodiment of the present invention.

FIG. 4 shows a process for rechanging the web address for the place corresponding to the network ID within the user's wireless communication device 100 into the previous web address according to an embodiment of the present invention.

Firstly, the checking section 230 of the wireless communication device 100 periodically monitors the changing or not of the network ID set to the wireless communication device 100 while interlocking with the network setting programs (S410).

When the checking section 230 checks the changing of the network ID set to the wireless communication device 100 (S420), the processing section 240 may rechange a part changed into the web address for the place corresponding to the network ID information into the previous used web address on driving web browser programs by the user through the web browser programs (S430).

When the network ID set to the wireless communication device 100 is not changed, the checking section 230 of the wireless communication device 100 repeats the monitoring for the changing or not of the network ID set to the wireless communication device 100 (S440).

According to an embodiment of the present invention, the present invention may solve inconvenience that should input search keywords for visiting places after the users in full access the portal site and that again should search the search results, that the user wants, of many search results outputted through the portal site by receiving in real time the place information for the place visited by the user without separable searches.

In addition, the place information provided to the user's wireless terminal may be provided as the received place information as information having high practicality, that the operator of the corresponding place want to provide, thereby to solve problems for non-efficient information providing that the operator of the place registers the place information that wants to be provided to the user visiting the place into the portal site in past and therefore the user searches information for the corresponding place by search results.

On the other hand, although a user directly knows addresses of web pages or websites that provide the place information for the place, the user may solve inconvenience that should directly input the addresses of the web pages or the websites providing the place information for the place after driving web browsers.

What is claimed is:

1. A wireless communication device, comprising;
   a checking section checking a network ID of a communication network IDs of one or more communication network devices accessible by the wireless communication device at current place, wherein the network ID is set to the communication network by automatic setting or user's selection, and checking a web address of a place corresponding to the checked network ID, wherein the web address provides place information, which is selected by an operator of the place, to the user, wherein the web address corresponding to the network ID is transmitted from a place device of the operator to the checking section for checking, wherein the place device is connected to the wireless communication device, connects the web address and the network ID, and stores the web address and the network ID into a storing medium to transmit the web address corresponding to the network ID to the wireless communication device, and wherein the storing medium interconnects and stores place identification information, the network ID which is set to the communication network device, and the web address; and a processing section changing a previous web address of an output object on a web browser program into the web address for the place corresponding to the checked network ID while interlocking with the web browser program equipped in the wireless communication device, wherein the processing section changes the web address in response to location information visited by the user by using the network ID, and re-changes the web address into the previous web address on the web browser when the network ID is changed as the user deviates the current place.

2. The wireless communication device according to claim 1, wherein the checking section receives the web address for the place corresponding to the checked network ID from a place device connected to the network device through the network device and checks the received web address, or checks the web address through a server on a communication network.

3. The wireless communication device according to claim 1, wherein the processing section rechanges the web address for the place corresponding to the network ID set on the web browser program into the previous web address when the changing of the network ID set to the wireless communication device is checked by the checking section.

4. The wireless communication device according to claim 1, wherein at least one of the checking section and the processing section is a network setting program for outputting one or more communication network IDs accessible by the wireless communication device at the current place on a screen.

5. The wireless communication device according to claim 1, wherein at least one of the checking section and the processing section is a web browser program equipped in the wireless communication device.

6. The wireless communication device according to claim 1, wherein the wireless communication device has a network setting program for outputting at least one accessible communication network ID the at the current place on the screen and a web browser program for outputting a web corresponding to the web address.

7. The wireless communication device according to claim 6, wherein the wireless communication device has an automatic web address changing program for checking the ID information of one or more communication network IDs outputted by the network setting program, checking the web address for the place corresponding to the checked ID information, and changing the web address, for an output object, pre-set on the web browser program into the checked web address while interlocking with the web browser program.

8. The wireless communication device according to claim 7, further comprising a controller for controlling the programs.

9. The wireless communication device according to claim 7, wherein the automatic web address changing program is included in the network setting program or the web browser program.

10. The wireless communication device according to claim 1, wherein the place includes at least one of marts, department stores, retail stores, schools, churches, cathedrals, temples, gymnasiums, theaters, playgrounds, public agencies, hospitals, funfairs, amusement parks, accommodations, car repair shops, museums and exhibition halls, and the wireless communication device has the web address providing information for the place.

11. An information processing method comprising;
checking, by a checking section, a network ID of one or more communication network IDs accessible by a wireless communication device at current place, wherein the network ID is set to the communication network by automatic setting or user's selection, and checking a web address of a place corresponding to the checked network ID,
wherein the web address provides place information which is selected by an operator of the place to the user,
wherein the web address corresponding to the network ID is transmitted from a place device of the operator to the checking section for checking,
wherein the place device is connected to the wireless communication device, connects the web address and the network ID, and stores the web address and the network ID into a storing medium to transmit the web address corresponding to the network ID to the wireless communication device,
and wherein the storing medium interconnects and stores place identification information, the network ID which is set to the communication network device, and the web address; and
changing a previous web address of an output object on the web browser program equipped in the wireless communication device into the checked web address,
wherein changing comprising:
changing the web address in response to location information visited by a user by using the network ID; and
re-changing the web address into the previous web address on the web browser when the network ID is changed as the user deviates the current place.

12. The information processing method according to claim 11, further comprising rechanging the web address for the place corresponding to the network ID information set on the web browser program into the previous web address when the changing of the network ID set to the wireless communication device is checked.

13. A non-transitory computer-readable recording medium for recording programs to perform a method of claim 11.

14. The information processing method according to claim 11, further comprising outputting one or more communication network IDs accessible by the wireless communication device at current place on a screen.

15. The information processing method according to claim 11, further comprising outputting a web corresponding to the web address.

16. The information processing method according to claim 11, further comprising checking the ID information, set to the communication network by automatic setting or user's selection setting, of one or more communication network IDs outputted by the network setting program;
 checking the web address for the place corresponding to the checked ID information; and
 changing the web address, for an output object, pre-set on the web browser program into the checked web address while interlocking with the web browser program.

17. The information processing method according to claim 11, further comprising controlling the programs.

18. The information processing method according to claim 11, wherein the place includes at least one of marts, department stores, retail stores, schools, churches, cathedrals, temples, gymnasiums, theaters, playgrounds, public agencies, hospitals, funfairs, amusement parks, accommodations, car repair shops, museums and exhibition halls, and the wireless communication device has the web address providing information for the place.

* * * * *